3,247,151
POST CURING POLYMER OF VINYL ACETATE, ALLYL GLYCIDYL ETHER AND UNSATURATED ACID
John A. Casey, Plainfield, and Charles E. Blades, Berkeley Heights, N.J., assignors, by mesne assignments, to Cumberland Chemical Corporation, New York, N.Y., a corporation of Delaware
No Drawing. Filed July 26, 1961, Ser. No. 126,862
7 Claims. (Cl. 260—29.6)

This invention relates to aqueous interpolymer emulsions capable of forming films which may be cured and hence become resistant to organic solvents, water insoluble and non-redispersible. More particularly, the present invention relates to aqueous emulsions of an interpolymer of allyl glycidyl ether, a monomeric polymerizable $\alpha,\beta$-ethylenically unsaturated monocarboxylic acid, and vinyl acetate or a copolymer of vinyl acetate and an internal plasticizing monomer therefor and to coatings formed therefrom.

There exists a real need for an aqueous interpolymer emulsion which is stable after storage for long periods and which upon application to a surface to be coated forms a film which can be cured at convenient curing conditions to an insoluble, infusible, strongly adhering coating having high resistance to moisture.

Previously it was known in the prior art to produce crosslinked polymeric materials by the copolymerization of vinyl monomers with divinyl type materials. Such prior techniques possessed the disadvantage that crosslinking occurred during the polymerization so that the resulting polymeric product was crosslinked prior to its formation into a coating. This greatly reduced the usefulness of these polymers in the coating and film-forming arts.

Other prior techniques have involved the provision of copolymers containing functional groups which crosslink after application of the copolymer in the form of a coating. However, these prior processes have failed to produce a stable, aqueous copolymer emulsion characterized in that the emulsion remained storage stable over long periods and formed a film which was readily and substantially completely curable under reasonable curing conditions after application.

It is an object of the present invention to provide a novel aqueous interpolymer emulsion which is stable over long storage periods and which when applied to a surface forms a readily curable film.

It is a further object of the invention to provide a process for applying a curable film to a surface and subsequently curing the said film to form an insoluble, infusible, strongly adhering, water resistant coating.

Other objects will be apparent from the following description of the invention.

In accordance with the present invention, a novel interpolymer emulsion which is storage stable and which forms readily curable films is prepared by polymerizing under emulsion polymerization condtions vinyl acetate, an acrylic acid and allyl glycidyl ether. Internally plasticizing comonomers can be used together with the vinyl acetate in the formulations of the present invention.

Various emulsion polymerization conditions and techniques can be employed in preparing the instant novel interpolymer emulsion. Suitable and preferred techniques involve dispersing all or part of the mixture of monomers in an aqueous medium in small uniform droplets. Known homogenizing techniques can be employed to insure preparation of uniform dispersions of small droplets. Surface active agents are incorporated in the aqueous medium, usually in amounts ranging from about 0.5 to 5% by weight of the final emulsion. The nonionic surfactant such as the alkyl aryl polyether alcohols are preferred, although other surfactants can be employed. It is most preferred to employ a combination of a relatively hydrophobic and a relatively hydrophilic nonionic surfactant in preparing the emulsions of the invention.

The alkyl aryl polyether alcohols which may be empolyed as surfactants are made by condensing ethylene oxide on an alkyl substituted phenol. The products have the following general formula:

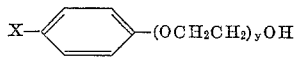

wherein X is an alkyl group containing from 8 to 9 carbon atoms and $y$ represents the average polyoxyethylene chain lengths. It is obvious that the products are actually mixtures with respect to the polyoxyethylene chain length and thus all reference to $y$ is taken to be an average. As the average chain length of polyoxyethylene increases, the product becomes more hydrophilic. For the purposes of the present application the term relatively hydrophobic nonionic surfactant includes the above-noted alkyl aryl polyether alcohols wherein $y$ is from 8 to 12, that is, the compounds contain from about 60% to about 70% ethylene oxide by weight of the entire product, while a relatively hydrophilic nonionic surfactant includes the above-noted alkyl aryl polyether alcohols wherein $y$ is from 15 to 100, that is, the compounds contain from about 75% to about 95% ethylene oxide by weight of the entire product.

The concentration of the relatively hydrophobic surfactant with respect to the relatively hydrophilic surfactant or vice versa can range between 25% to 75% of total surfactant concentration. For example, 25% of a relatively hydrophobic agent and 75% of a relatively hydrophilic agent or vice versa can be used. We have found that a relative concentration of approximately equal proportions of the hydrophobic and the hydrophilic agents is very advantageous.

The use of two or more surfactants which fall within the class of relatively hydrophobic agents and two or more surfactants which fall within the class of relatively hydrophilic agents may be employed; however, we have found that the use of more than one agent from each class is not required.

The use of a combination of nonionic surfactants of the classes referred to above produces emulsions which are storage stable. Also the use of this combination of surfactants enables the formation of excellent emulsions with a lower total concentration of the combined nonionic surfactant than could be required to produce a similar emulsion employing only one surfactant. It should be pointed out, however, that the use of a single nonionic surfactant does not result in the product of emulsions having good storage stability.

Polymerization initiators such as t-butyl hydroperoxide, hydrogen peroxide, potassium persulfate, and the like are employed. Redox systems are preferably employed wherein an activator such as sodium formaldehyde sulfoxylate, zinc formaldehyde sulfoxylate, sodium metabisulfite, sodium bisulfite, ferrous sulfate and the like is employed with the initiator.

Preferably, all or part of the monomer mixture is uniformly dispersed together with the surface active agents and protective colloid if used in the aqueous medium. The polymerization initiator is also added to the aqueous medium. The monomers are uniformly dispersed in the form of fine droplets and thoroughly homogenized. The temperature is adjusted to a suitable point, for example, 130° F., and the addition of activator solution, for example, an aqueous solution containing 5% sodium formaldehyde sulfoxylate and 2½% sodium acetate is begun.

The activator is added incrementally throughout the polymerization at a rate necessary to maintain the desired polymerization reaction temperature. In a specifically preferred practice of the invention, only a portion of the total monomers to be polymerized is initially dispersed in the aqueous medium. Subsequently, additional mutual monomer solution is added throughout the course of the polymerization.

The polymerization is suitably conducted at temperatures ranging from about 30° C. to the reflux temperature. The preferred temperature range is from about 40° C. to about 70° C. Polymerization is continued until substantially all of the monomer has polymerized. Polymerization times of the order of 3 to 8 hours are generally adequate although times outside this range can be employed.

The relative amounts of the monomers employed in the instant emulsion polymerization are of great importance. In order to provide adequate curing of films formed from the said emulsion, the allyl glycidyl ether should be employed in an amount of at least about 1% by weight of the total mixture of monomers. Amounts of allyl glycidyl ether in excess of about 10% based on the weight of the monomeric constituents are not desirable. A preferred range of concentration of the allyl glycidyl ether is 1% to about 3% by weight of the monomer mixture.

The $\alpha,\beta$ - ethylenically unsaturated monocarboxylic acids which may be employed in the present invention are such acids as acrylic acid, methacrylic acid, and crotonic acid. The $\alpha,\beta$-ethylenically unsaturated monocarboxylic acids may be employed in amounts ranging from about 0.1 to about 5% based on the total weight of monomers. A preferred range of $\alpha,\beta$-ethylenically unsaturated monocarboxylic acids is from about 0.5 to about 2% based on the total weight of monomers.

The curing reaction involved with the polymers of the present invention is the reaction between the epoxide groups of the allyl glycidyl units with the carboxylic acid groups of the acrylic acid. Thus, the amount of $\alpha,\beta$-ethylenically unsaturated monocarboxylic acid employed in the polymerization is dependent at least to a degree on the amount of epoxide groups contained therein.

The remainder of the monomeric mixture employed in preparing the copolymers of the present invention may be vinyl acetate. More preferably, however, an additional monomer which acts as an internal plasticizer is employed in less than equal parts by weight based on the vinyl acetate. Preferably the plasticizing comonomer is employed in amounts of 2–40% by weight of the combined vinyl acetate and plasticizing comonomer. Examples of suitable internally plasticizing monomers include esters of acrylic and methacrylic acid such as, for example, ethyl acrylate, 2-ethyl hexyl acrylate and butyl acrylate. Other comonomers which may be employed are vinyl stearate, dibutyl maleate and dibutyl fumarate.

In preferred practice of the invention, a portion of the monomer mixture is dispersed together with suitable dispersing agents in an aqueous medium. The polymerization is initiated by the addition of polymerization initiator and activator. Thereafter, throughout substantially the remainder of the polymerization, a mutual monomer solution is incrementally added to the aqueous medium. Additionally, more activator and initiator are added from time to time during the course of the polymerization.

The interpolymer emulsion produced in accordance with the present invention is extremely stable even upon prolonged standing for from 3 to 4 months. There is no evidence of significant crosslinking and coagulation of the polymeric constituents of the said emulsions during the copolymerization and storage.

The interpolymer emulsions are remarkably suitable for the preparation of curable films. When applied to a surface, for example, a metal surface, after the evaporation of the water, the resulting copolymer film can be cured in a matter of a few minutes by subjecting the coated surface to temperatures of the order of 100° to 200° C. Especially desirable conditions involve curing the film for 30 minutes at 150° C. In this way, films which are substantially insoluble in organic solvents and which are insoluble and non-redispersible in water can be readily formed. Milder curing conditions, for example, room temperature can be also employed. With these milder conditions, significantly longer curing times are needed in order to obtain completely cured polymeric films.

The emulsions of the present invention are eminently suited as primer coats, for example, in the painting of automobiles. An outstanding advantage of the emulsions is that they are non-flammable, thus introducing no fire hazards during application and curing. A further advantage is that films formed from the emulsions can be rapidly and completely cured. Still another advantage of the emulsions is that they adhere very strongly to various substrates. Still an additional advantage is that the copolymer emulsions of the invention are extremely stable even under severe storage conditions.

The following examples illustrate the present invention:

EXAMPLE I

A charge was prepared in a blender, consisting of 250 g. of vinyl acetate, 7 g. allyl glycidyl ether, 0.5 g. crotonic acid, 33.5 g. of a polyoxyethylene nonylphenyl ether containing an average of about 86% ethylene oxide by weight and 16.5 g. of a polyoxyethylene nonylphenyl ether containing an average of about 65% ethylene oxide by weight and 875 g. of distilled water. The charge was homogenized and flushed with nitrogen. It was heated to 55° C. with suitable stirring; 1 ml. of t-butyl hydroperoxide was added; and an activator solution of 4% sodium formaldehyde sulfoxylate and 1% sodium acetate were added in 1 ml. increments until an exothermic reaction began. A mutual solution of monomers composed of 610 g. vinyl acetate, 100 g. ethyl acrylate inhibited with 0.1% hydroquinone, 9.5 g. of crotonic acid and 23 g. of allyl glycidyl ether, were added at a rate which required 3 hours for the addition. During this addition, activator solution and catalyst were added as required to maintain the reaction at 55° C. to 58° C., maintaining the cooling water at 45° C. The exothermic reaction continued for ½ to 1 hour after the delayed addition was completed. The temperature in the pot was then held at 55° C.; activator and catalyst were added until the residual monomer was reduced to less than 1%. The entire polymerization operation required approximately 61 ml. of activator solution and 6.5 ml. of catalyst. The product emulsion contained 52% by weight solids.

EXAMPLE II

The formulation and process were the same as Example I, except that 2.5 g. of allyl glycidyl ether were used in the initial charge, and 7.5 g. of allyl glycidyl ether were used in the delayed addition solution. The vinyl acetate in the delayed addition was increased to 630 g. The activator solution was at 2% strength.

The polymer thus produced has been found to possess the following properties.

| | |
|---|---|
| pH | 4.5 to 5.0 |
| Emulsion viscosity (Brookfield) at 60 r.p.m. | 150±50 |
| Particle size, range | <½μ |
| Percent insolubles (chloroform) | negligible |
| Percent insolubles after baking at 120° C. for 30 min., percent | 85–100 |

The polymer had improved acid and alkali resistance properties over the compositions of the prior art and was impact resistant, flexible, adhered to the metal substrate and underwent virtually minimal softening by top coating materials. Somewhat improved water resistance characteristics are obtained by replacing ethyl acrylate, the plasticizing monomer, with vinyl stearate.

An emulsion cast film, made according to Example I above, underwent a cure in the dry state at a slow rate; 47% insolubles at room temperature after standing 30 days; 61% insolubles in 60 days. With increasing temperature, the cure rate increases rapidly. Cures were effected at temperatures ranging from 100° C. to 175° C., from 15 to 90 minutes. Optimum conditions for adequate insolubilizations are attained by baking at 150° C. for 30 minutes. The dispersed polymer showed no increase in insolubles over a period of two months, which is an advantageous feature indicating very satisfactory shelf-stability. Thus, using the composition of our invention it is possible to prepare an emulsion which is shelf-stable for at least two months, but which may be cured rapidly in the dried film state without the addition of curing agents.

EXAMPLE III

A charge was prepared comprising 67.38 lbs. of vinyl acetate, 2.37 lbs. of allyl glycidyl ether, 0.80 lbs. of crotonic acid, 13.00 lbs. of a polyoxyethylene nonylphenyl ether containing an average of about 86% ethylene oxide by weight, 4.58 lbs. of a polyoxyethylene nonylphenyl ether containing an average of about 65% ethylene oxide by weight, and 206.00 lbs. of water. The charge was homogenized in a gear pump for 30 minutes. The homogenized charge was passed to a polymerization kettle which had been purged with nitrogen. The charge was heated to 130° F., and 50 cc. of t-butyl hydroperoxide were added. Addition of an aqueous activator solution containing 5% by weight sodium formaldehyde sulfoxylate and 2½% by weight sodium acetate was started at the rate of 25 cc. per minute.

As soon as polymerization commenced, the polymerization kettle jacket temperature was lowered to 90° F. and addition of a mutual monomer solution was begun at a rate designed to complete the addition of said monomer solution in three hours. The mutual monomer solution consisted of 169.13 lbs. of vinyl acetate, 27.50 lbs. of ethyl acrylate, 1.95 lbs. of crotonic acid, and 5.89 lbs. of allyl glycidyl ether.

The activator solution was added at a rate adequate to maintain the temperature of the polymerizing mixture at 130–140° F. while the polymerization jacket temperature was maintained at 90° F. After completion of the polymerization reaction, the jacket temperature was raised to 135° F. and the addition of catalyst and activator was continued until the residual monomer was reduced to below 1%. The following illustrates the characteristics of the emulsion which was obtained:

| | |
|---|---|
| Solids | 55.1 |
| Viscosity (Brookfield) at 60 r.p.m. | 137 |
| Residual monomer | 1.08 |
| pH | 4.26 |
| Solubility in benzene: | |
| Percent insolubles (untreated film) | negligible |
| Cured film (1 hr./150° C.) percent | 88 |

EXAMPLE IV

The formulation and process were the same as Example I except that 0.5 g. of acrylic acid were used in the initial charge in place of the crotonic acid and 9.5 g. of acrylic acid were used in the delayed addition in place of the crotonic acid. The product emulsion contained 52% by weight solids.

EXAMPLE V

The formulation and process were the same as Example I except that 0.5 g. of methacrylic acid were used in the initial charge in the place of the crotonic acid and 9.5 g. of methacrylic acid were used in the delayed addition in place of the crotonic acid. The product emulsion contained 52% by weight solids.

Obviously, many modifications and variations of the invention as hereinbefore set forth may be made without departing from the spirit and scope thereof, and, therefore, only such limitations should be imposed as are indicated in the appended claims.

We claim:
1. The method of forming a polymer emulsion which is storage stable and from which readily curable polymer films can be formed which comprises subjecting a mixture of monomers comprising vinyl acetate, 1 to 10% by weight of the monomer mixture of allyl glycidyl ether, and 0.5 to 5% by weight of the monomer mixture of an $\alpha,\beta$-ethylenically unsaturated monocarboxylic acid to emulsion polymerization conditions in the presence of a polymerization initiator and a pair of ethylene oxide adducts of alkyl phenols wherein the alkyl radical contains from 8 to 9 carbon atoms, the first of said ethylene oxide adducts containing from about 60 percent to 70 percent of ethylene oxide by weight, and the second of said ethylene oxide adducts containing about 75 percent to 95 percent of ethylene oxide by weight, the combined amount of said ethylene oxide adducts being in the range of about 0.5 percent to 5 percent of the weight of the final emulsion.

2. The method of forming a polymer emulsion which is storage stable and from which readily curable polymer films can be formed which comprises subjecting a monomer mixture comprised of vinyl acetate, a plasticizing monomer selected from the group consisting of alkyl acrylates, alkyl methacrylates, vinyl stearate and dibutyl maleate, and dibutyl fumarate in amount of 2 to 40% of the combined weight of vinyl acetate and plasticizing monomer, said alkyl acrylates and said alkyl methacrylates containing 2 to 8 carbon atoms in the alkyl group, 1 to 10% by weight of the monomer mixture of allyl glycidyl ether, and 0.5 to 5% by weight of the monomer mixture of an $\alpha,\beta$-ethylenically unsaturated monocarboxylic acid to emulsion polymerization conditions in the presence of a polymerization initiator and a pair of ethylene oxide adducts of alkyl phenols wherein the alkyl radical contains from 8 to 9 carbon atoms, the first of said ethylene oxide adducts containing from about 60 percent to 70 percent of ethylene oxide by weight, and the second of said ethylene oxide adducts containing about 75 percent to 95 percent of ethylene oxide by weight, the combined amount of said ethylene oxide adducts being in the range of about 0.5 percent to 5 percent of the weight of the final emulsion.

3. The method of forming a storage stable vinyl acetate emulsion from which readily curable polymer films can be formed which comprises mixing water, vinyl acetate, and a combination of at least two nonionic surfactants, each of said nonionic surfactants being an ethylene oxide adduct of an alkyl phenol wherein the alkyl radical contains from 8 to 9 carbon atoms, the first of said ethylene oxide adducts containing from about 60 percent to 70 percent of ethylene oxide by weight, and the second of said ethylene oxide adducts containing from about 75 percent to 95 percent of ethylene oxide by weight, to form an emulsion, adding a polymerization initiator, heating to initiate polymerization, adding vinyl acetate, a plasticizing monomer selected from the group consisting of alkyl acrylates, alkyl methacrylates, vinyl stearate, and dibutyl maleate, and dibutyl fumarate in an amount of about 2 to 40% by weight of total vinyl acetate and plasticizing monomer, said alkyl acrylates and said alkyl methacrylates containing 2 to 8 carbon atoms in the alkyl group, 1 to 10% by weight of total monomers of allyl glycidyl ether and 0.5 to 5% by weight of total monomers of acrylic acid and completing polymerization.

4. An aqueous polymer emulsion of an interpolymer formed by copolymerizing a monomer mixture comprising vinyl acetate, 1 to 10 percent by weight of total monomers of allyl glycidyl ether and 0.5 to 5 percent of total monomer of an $\alpha,\beta$-ethylenically unsaturated monocarboxylic acid, in the presence of a polymerizaton initiator and a pair of ethylene oxide adducts of alkyl phenol wherein the alkyl radical contains from 8 to 9 carbon atoms, the first of said ethylene oxide adducts containing from about 60 to 70 percent of ethylene oxide by weight, and the second of said ethylene oxide adducts containing from about 75 percent to 95 percent of ethylene oxide by weight, the total amount of said ethylene oxide adduct being from about 0.5 to 5 percent by weight of the final emulsion.

5. An aqueous polymer emulsion of an interpolymer formed by copolymerizing a monomer mixture comprising vinyl acetate, a plasticizing comonomer selected from the group consisting of alkyl acrylates, alkyl methacrylates, vinyl stearate, dibutyl maleate, and dibutyl fumarate in an amount of 2 to 40 percent of the combined weight of vinyl acetate and plasticizing comonomer, said alkyl acrylates and said alkyl methacrylates containing 2 to 8 carbon atoms in the alkyl group, 1 to 10 percent by weight of total monomers of alkyl glycidyl ether and 0.5 to 5 percent of total monomer of an $\alpha,\beta$-ethylenically unsaturated monocarboxylic acid, in the presence of a polymerization initiator and a pair of ethylene oxide adducts of alkyl phenol wherein the alkyl radical contains from 8 to 9 carbon atoms, the first of said ethylene oxide adducts containing from about 60 to 70 percent of ethylene oxide by weight, and the second of said ethylene oxide adducts containing from about 75 percent to 95 percent of ethylene oxide by weight, the total amount of said ethylene oxide adduct being from about 0.5 to 5 percent by weight of the final emulsion.

6. The emulsion of claim 4 wherein said $\alpha,\beta$-ethylenically unsaturated monocarboxylic acid is crotonic acid.

7. The emulsion of claim 5 wherein said plasticizing comonomer is ethyl acrylate.

References Cited by the Examiner
UNITED STATES PATENTS

| | | | |
|---|---|---|---|
| 2,787,561 | 4/1957 | Sanders | 260—29.6 |
| 2,850,535 | 9/1958 | Lane | 260—613 |
| 2,892,802 | 6/1959 | Budewitz | 260—29.6 |

SAMUEL H. BLECH, *Primary Examiner.*

LEON J. BERCOVITZ, MURRAY TILLMAN,
*Examiners.*